United States Patent [19]

Dilley

[11] 3,875,517

[45] Apr. 1, 1975

[54] TRACKING PHASE DETECTOR FOR SURFACE WAVE CORRELATORS

[75] Inventor: Douglas M. Dilley, San Diego, Calif.

[73] Assignee: The United States of America as represented by the Secretary of the Navy, Washington, D.C.

[22] Filed: Nov. 26, 1973

[21] Appl. No.: 419,183

[52] U.S. Cl. ................ 328/155, 324/77 G, 329/117, 329/122, 331/107 A, 331/23, 343/100 CL, 333/3 OR, 333/72

[51] Int. Cl. ........................... H03b 3/04, H03d 3/16

[58] Field of Search ............ 329/117, 122; 328/155, 328/162, 163; 331/107 A, 176, 44, 66, 18, 23, 25, 9; 235/181; 324/77 G, 77 H; 343/100 CL; 333/3 OR, 72

[56] References Cited

UNITED STATES PATENTS

| | | | |
|---|---|---|---|
| 3,355,668 | 11/1967 | Boensel et al. | 328/162 X |
| 3,393,380 | 7/1968 | Webb | 329/122 X |
| 3,409,841 | 11/1968 | Munn | 331/176 X |
| 3,675,163 | 7/1972 | Hartmann et al. | 333/72 X |
| 3,745,485 | 7/1973 | McShan | 331/107 A |
| 3,775,695 | 11/1973 | Hill | 331/25 X |
| 3,794,928 | 2/1974 | Stump et al. | 329/122 X |

*Primary Examiner*—Alfred L. Brody
*Attorney, Agent, or Firm*—R. S. Sciascia; G. J. Rubens; T. M. Phillips

[57] ABSTRACT

A circuit for processing phase coded signals using a surface wave correlator. A feedback surface wave oscillator including the surface wave correlator in a negative feedback arrangement is used to sense change in characteristics due to change in temperature and generates a reference feedback signal to compensate for the change in characteristics.

6 Claims, 4 Drawing Figures

TRACKING PHASE DETECTOR FOR SURFACE WAVE CORRELATORS

BACKGROUND OF THE INVENTION

Surface wave device configurations suffer from two major difficiencies. The device parameters are temperature sensitive and straightforward interdigital transducer designs have notches in their bandpass characteristics which occur at center band and at intervals of one-half the data rate on either side of center band. Temperature dependence in the surface wave device causes performance deterioration with change in temperature while notches in the bandpass preclude the straightforward use of feedback systems for tracking and phase-locking a reference signal for coherent detection of PSK signals.

The present invention uses the bandpass characteristic of a surface wave correlator to generate a reference signal for coherent detection. The bandpass characteristics of the surface wave devices under discussion have a (sin $x$)/$x$ envelope in which notches, or response nulls, occur at center frequency and at intervals of one-half the data rate on either side of center frequency. These notches are characteristic of the interdigital array parameters and occur as a result of phase cancellation within very narrow frequency bands.

SUMMARY OF THE INVENTION

The present invention provides a means for compensating for the change in characteristics of a surface wave device when used as a correlator to process phase shift keyed (PSK) signals. A surface wave oscillator using the same or identical surface wave correlators generates a signal at the center frequency (coincident with the center notch). The surface wave device is connected in the negative feedback loop of the oscillator circuit so that the oscillator equilibrium occurs at the notch. A broad band filter in the positive feedback loop of the oscillator precludes oscillation at the undesired notch frequencies on either side of the center notch. The generated signal is compared with a reference signal to generate a correction signal when there is a shift in the notch occuring in the surface wave correlator. The correction signal changes the frequency of the local oscillator. The change in the output of the local oscillator then follows any change in frequency that might occur in the surface wave correlator.

OBJECTS OF THE INVENTION

An object of the invention is to provide a means of compensating for frequency shift in a surface wave device.

Another object of the invention is to provide a means of compensating for frequency shift caused by change in temperature of a surface wave device by tracking the shift of the center notch when the device is used as a correlator in a phase shift keying system.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
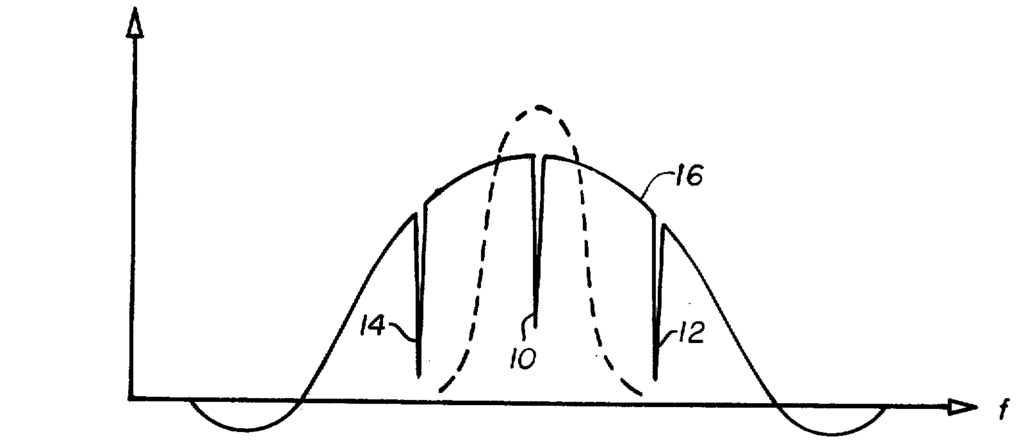
FIG. 1 shows a typical surface wave correlator bandpass characteristic.

Referring now to the drawings there is shown in FIG. 1 the bandpass characteristic of a surface wave filter. Because of phase cancellation within very narrow frequency bands (about 1% of the correlator bandwidth) notches or nulls 10, 12, and 14 appear in the curve 16. One important feature of the invention is the tracking of the center notch 10.

Figure 2:
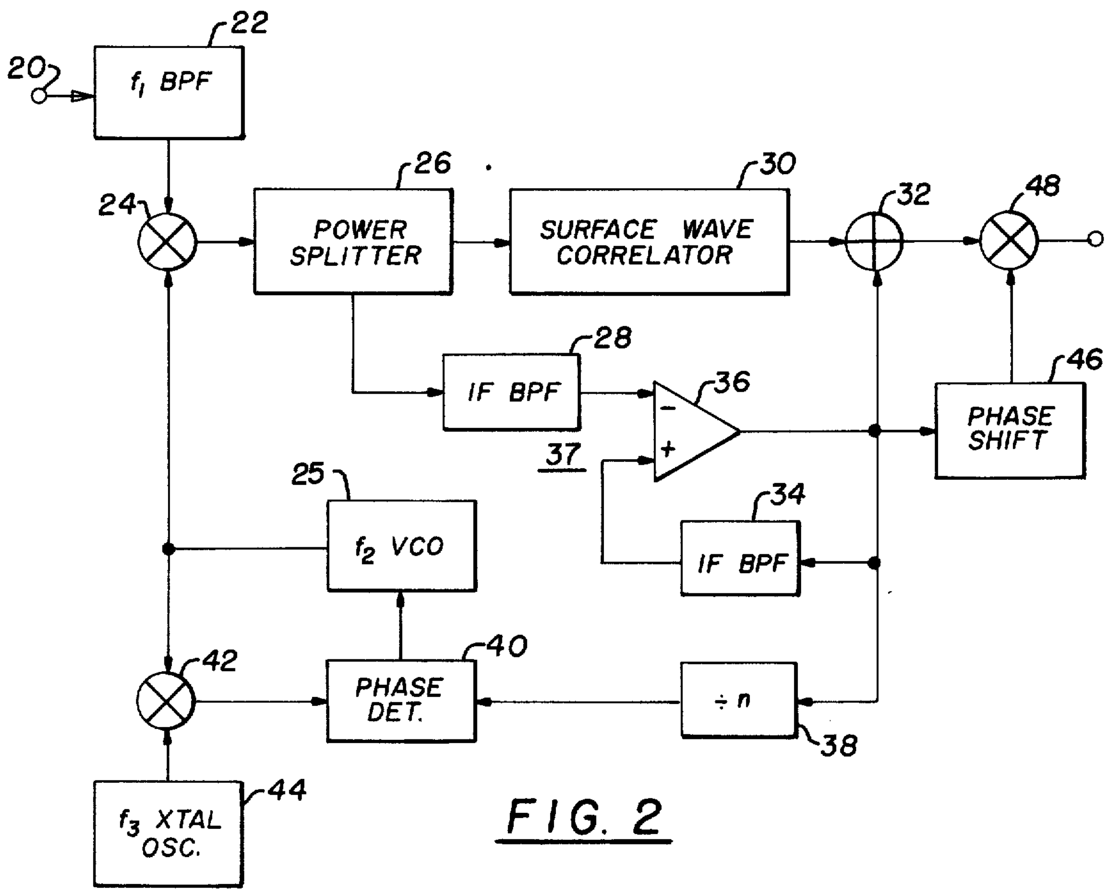
FIG. 2 shows in block diagram form an embodiment of the invention employing the same surface wave device in the oscillator circuit.

Referring now to FIG. 2 wherein there is shown that portion of a spread spectrum communications receiver for detecting a received phase shift keyed signal. The received signal, f1, at terminal 20 is fed through a bandpass filter 22 to converter mixer 24 where it is mixed with the output signal from local oscillator 25 which is shown as a voltage controlled oscillator. The IF signal out of mixer 24 is fed to power splitted 26 where a portion of the IF signal is fed to IF bandpass filter 28. The remainder of the signal is fed to surface wave correlator 30. The output of correlator 30 is fed to adding circuit 32.

Broad bandpass filters 28, and 34, amplifier 36 and surface wave correlator 30 make up a surface wave oscillator 37. The oscillator output is fed through a frequency divider or down counter 38 to a phase detector 40. The other input to phase detector 40 is the output of mixer circuit 42 which has one input connected to the output of local oscillator 25 and the other input connected to the output of a reference crystal oscillator 44. The output of oscillator 37 is also fed through phase shifter 46 to coherent detector 48.

In operation, input signal, *f1*, is translated to the nominal center frequency of correlator 30 by down converter or mixer 24. The output frequency, *f2*, of local oscillator 25 is phase-locked through mixer 42 to maintain the proper relationship between f1 and surface wave oscillator 37. Surface wave oscillator consists of amplifier 36, broad bandpass filters 28, 34 (shown in dotted line on FIG. 1) and surface wave correlator 30. The central notch 10 (FIG. 1) of correlator 30 is thus included in the negative feedback path of oscillator 37. As the parameters of correlator 30 change with change in temperature, control notch 10 shifts accordingly. Since the frequency at which notch 10 occurs is also the equilibrium frequency for surface wave oscillator 37, its frequency tracks with notch 10 as it shifts. The output signal from oscillator 37 is down counted in divider circuit 38 to be compatible with phase detector 40. The output signal from divider circuit 38 is compared with a reference signal in phase detector 40. Any output signal from detector 40 is fed to voltage controlled oscillator 25 for controlling the local oscillator frequency to track with the shift in frequency of correlator 30.

Figure 3:
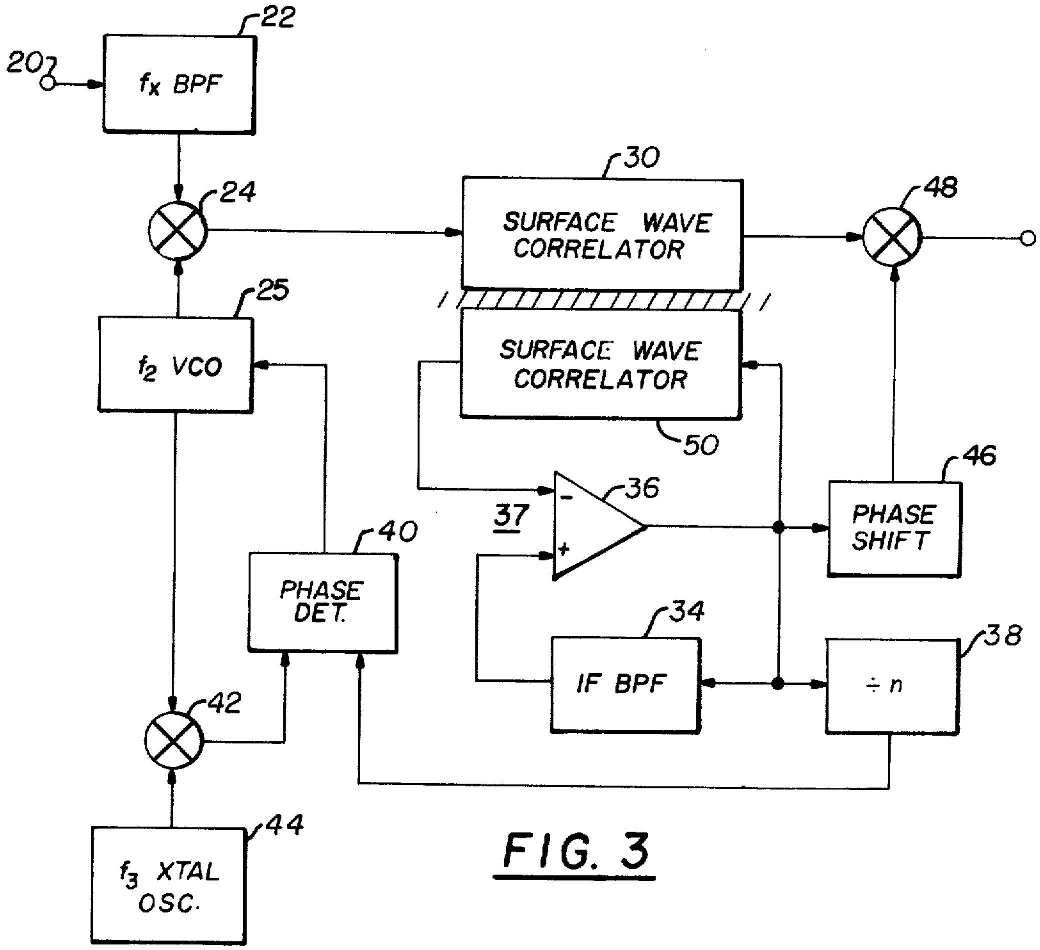
FIG. 3 shows in block diagram form an embodiment of the invention employing an identical surface device in the oscillator circuit.

In the embodiment of FIG. 3, oscillator 37 uses a correlator 50 that is identical to correlator 30 for its notch filter. Correlators 30 and 50 are thermally coupled so that their characteristics will track with change in temperature. The remainder of the circuit functions in the same manner as in the circuit of FIG. 1.

Figure 4:
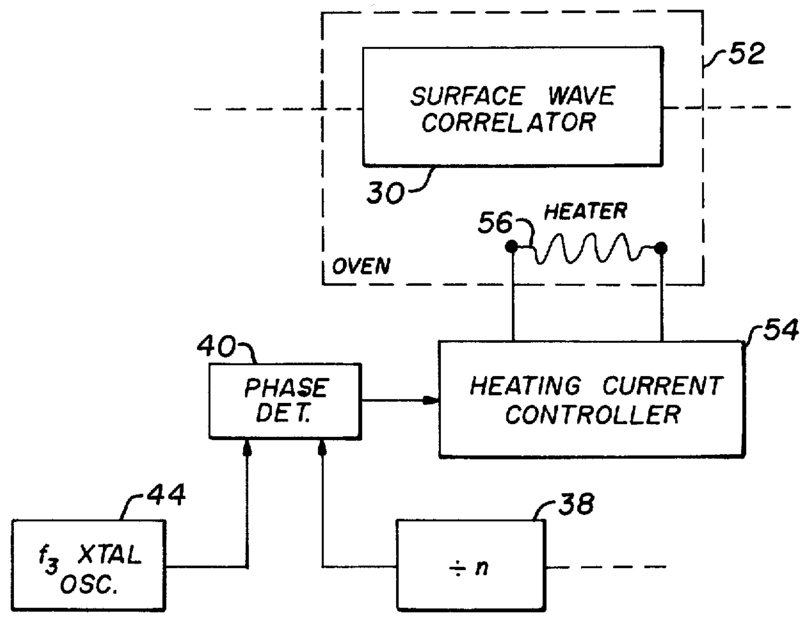
FIG. 4 shows a modification of the system of FIG. 1 utilizing heater control.

In the embodiment of FIG. 4, correlator 30 is placed in a temperature controlled oven 52. The correction signal from detector 40 is fed to heating current controller 54 which controls heater element 56. By maintaining a constant temperature in oven 52, there should be no change in the parameter of correlator 30.

Obviously many modifications and variations of the present invention are possible in the light of the above teachings. It is therefore to be understood that within the scope of the appended claims the invention may be practiced otherwise than as specifically described.

What is claimed is:

1. In a circuit for processing phase coded signals having a surface wave correlator whose frequency characteristics vary with variations in temperature:

a. a surface wave correlator having input means for receiving signals to be processed and having an output, b. circuit means coupled to said surface wave correlator for sensing the change in frequency characteristics of said correlator due to temperature change and generating an output signal, c. a reference signal source, d. comparison circuit means coupled to said circuit means and to said reference signal source for generating a correction signal to compensate for said sensed change in characteristics.

2. The processing circuit of claim 1 wherein said circuit means is an oscillator circuit and includes said surface wave correlator connected in the negative feedback loop of said oscillator circuit.

3. The processing circuit of claim 1 wherein said circuit means is thermally coupled to said surface wave correlator by means of an identical surface wave correlator being positioned so as to be subjected to the same temperature as said first mentioned surface wave correlator.

4. The processing circuit of claim 1 wherein said correction signal is used as a control signal to control the temperature of said surface wave correlator.

5. The processing circuit of claim 2 wherein said oscillator circuit comprises:

a. an operational amplifier having negative and positive inputs and an output, b. a first bandpass filter tuned to the center notch frequency of said surface wave correlator connected between the input of said surface wave correlator and the negative input of said operational amplifier, c. a second bandpass filter tuned to the center notch frequency of said surface wave oscillator connected between the outputs of said surface wave correlator and said operational amplifier and the positive input of said operational amplifier.

6. The processing circuit of claim 3 wherein said oscillator circuit comprises:

a. an operational amplifier having negative and positive inputs and an output, b. a first bandpass filter tuned to the center notch frequency of said surface wave correlator connected between the input of said identical surface wave correlator and the negative input of said operational amplifier, c. a second bandpass filter tuned to the center notch of said surface wave correlator connected between the outputs of said operational amplifier and identical surface wave correlator and the positive input of said operational amplifier.

* * * * *